United States Patent
Tiberghien et al.

(10) Patent No.: US 8,890,641 B2
(45) Date of Patent: Nov. 18, 2014

(54) METHOD FOR CONTROLLING THE MAGNETIC CLAMPING OF A PART AND MAGNETIC CLAMPING DEVICE USING SUCH A METHOD

(71) Applicant: Staubli Faverges, Faverges (FR)

(72) Inventors: Alain-Christophe Tiberghien, Sevrier (FR); Sylvain Puget, Seythenex (FR); Sylvain Chachereau, Doussard (FR)

(73) Assignee: Staubli Faverges, Faverges (FR)

( * ) Notice: Subject to any disclaimer, the term of this patent is extended or adjusted under 35 U.S.C. 154(b) by 0 days.

(21) Appl. No.: 14/175,613

(22) Filed: Feb. 7, 2014

(65) Prior Publication Data

US 2014/0240069 A1 Aug. 28, 2014

(30) Foreign Application Priority Data

Feb. 22, 2013 (FR) ...................................... 13 51577

(51) Int. Cl.
 *H01F 7/20* (2006.01)
 *B25B 11/00* (2006.01)
(52) U.S. Cl.
 CPC ................................... *B25B 11/002* (2013.01)
 USPC ............................ 335/290; 335/289; 361/145
(58) Field of Classification Search
 USPC ........ 335/289, 290, 295; 269/8; 361/144, 145
 See application file for complete search history.

(56) References Cited

U.S. PATENT DOCUMENTS

| 2007/0290780 A1 | 12/2007 | Tiberghien et al. |
| 2010/0092587 A1 | 4/2010 | Kimura |

FOREIGN PATENT DOCUMENTS

| EP | 1867437 A1 | 12/2007 |
| WO | 03009972 A2 | 2/2003 |
| WO | 03009972 A3 | 2/2003 |

*Primary Examiner* — Ramon Barrera
(74) *Attorney, Agent, or Firm* — Dowell & Dowell, PC

(57) ABSTRACT

In this method, magnetic studs housed in a plate are connected to magnetic flux measuring circuits, which define measuring zones, and to power circuits that make it possible to magnetize or demagnetize the studs. The method comprises prior steps that consist in determining (100) at least two treatment zones each defined by at least one measuring zone and defining (102) a surface of the clamping plate in contact with the part to be clamped, as well as following steps consisting, for each treatment zone, in identifying (103) one or more magnetic studs included in a surface of the clamping plate in contact with the part to be clamped, measuring (105) the magnetic flux produced by the stud or studs identified previously, calculating (106) an actual magnetic clamping force based on the measurement of the preceding step and on the identification made previously, calculating (108) a theoretical magnetic force thanks to this identification.

The magnetic clamping device, comprises means intended to implement a method such as described hereinabove and a clamping plate that comprises at least two measuring circuits arranged one on top of the other, in relation to a plan perpendicular to the weight of the part to be clamped.

19 Claims, 4 Drawing Sheets

METHOD FOR CONTROLLING THE MAGNETIC CLAMPING OF A PART AND MAGNETIC CLAMPING DEVICE USING SUCH A METHOD

This invention relates to a method for controlling the magnetic clamping of a part and to a clamping device using such a method.

The technology of magnetic clamping is used in various fields, such as that of injection moulding of plastic material, and more generally in many industrial installations that require the clamping of a part, such as an injection press that has a mould to be clamped, with a substantial, reversible and controlled force. In the field of plastic injection, the automating of procedures is becoming a substantial element in order to reduce operating times and to secure the manoeuvres of a mould between the plastic injection phases.

A persistent challenge remains to make less constraining the various operations carried out by the operator in the presence of heavy and dangerous loads and in an industrial environment that is difficult in terms of space, heat and chemical vapours.

It is known from EP-A-1 419 034 to create an environment for monitoring the clamping conditions of a mould by detecting the overall changes in the magnetic flux of a magnetic plate. The proposed device can inform the operator when the overall change of the magnetic flux exceeds a determined alert threshold. This method for controlling the device only considers shapes of parts to be clamped that are simple, i.e. surfaces facing the magnetic plate which are, for example, of rectangular or circular or even polygonal shape. As such, the differences in flux calculated using the magnetic flux measured are calculated only in a global way for the clamping plate, using rough dimensions.

It is also known from EP-A-1 867 437 to add to systems of magnetic studs, comprised in a magnetic plate, coils connected in series to a measuring circuit connected to a unit for controlling in order to measure magnetic fluxes in the magnetic plate. The proposed device has windings around each magnetic stud that make it possible to carry out a first magnetic flux measuring circuit passing through four reference magnetic studs, normally covered, and a second magnetic flux measuring circuit passing through the remaining studs that collects the sum of the measurements of all of the coils. This arrangement makes it possible to deduce solely the overall covering of the plate by the part to be clamped and to calculate the magnetic flux, in an overall manner, of the magnetic plate.

It is also known from WO-A-2008/105042 to provide a magnetic plate with proximity sensors that detect the start of the vertical tilting of the part, when the clamping is no longer secure. This device does not make it possible to anticipate the tilting of the part without having unhooked the mould and unsecured the installation, but only to react to this tilting.

It is these disadvantages that the invention intends more particularly to overcome by proposing a new method for controlling the magnetic clamping of a part that makes reliable, secures the clamping and meets the new standards in effect.

For this purpose, the invention relates to a method for controlling the magnetic clamping of a part in a magnetic clamping device of an industrial installation comprising, a unit for controlling the magnetic clamping, a clamping plate whereon is positioned the part to be clamped, several magnetic studs housed in this plate, with the studs being connected to magnetic flux measuring circuits defining measuring zones and to power circuits making it possible to magnetise or demagnetise the studs. In accordance with the invention, the method comprises beforehand a) a step consisting in determining at least two treatment zones each defined by at least one measuring zone, b) a step that consists in defining a surface of the clamping plate in contact with the part to be clamped.

Then the method comprises for each treatment zone, steps consisting in:

c) identifying one or more magnetic studs included in the surface of the clamping plate in contact with the part to be clamped, d) measuring the magnetic flux produced by the stud or studs identified in step c), e) calculating an actual magnetic clamping force based on the measurement of the step d), on the definition of the surface in contact carried out in step b) and on the identification of the studs carried out in step c), f) calculating a theoretical magnetic force thanks to the definition of the surface in contact carried out in step b) and the identifying of studs carried out in step c).

Thanks to the invention, the knowledge of the clamping conditions is optimised, detecting situations of tilting is improved, anomalies concerning incorrect detections or errors concerning non-detection are reduced, the risks of an incident are limited and the effectiveness of the man/machine system for the operations of changing the part to be clamped is improved. Indeed, the dividing of the clamping support into several measuring circuits, and the proper identification of the magnetic studs that are covered or not covered by the part to be clamped make it possible to obtain a precise measurement of the actual magnetic losses and of the actual holding torque to tilting torque ratio.

According to advantageous but not mandatory aspects of the invention, such a method can incorporate one or several of the following characteristics, taken in any technically permissible combination:

The method comprises a step consisting for each treatment zone, in:
g) comparing the actual magnetic clamping force and the theoretical magnetic force calculated in steps e) and f).

The method comprises steps consisting for each treatment zone, in:
h) calculating a point of application of the actual magnetic force by considering the barycentre of the covered surfaces of the studs identified in the step c),
i) calculating a holding torque of the actual magnetic force using the results of the calculations of steps e) and h).

The method comprises steps consisting in:
j) calculating the theoretical torque for the tipping of the part based on characteristic parameters of the part to be clamped and on characteristic parameters of the clamping plate,
k) comparing a sum of holding torques of the actual magnetic forces calculated for each treatment zone during the step i) with the theoretical torque (K) for tipping calculated in the step j).

The method comprises steps consisting in:
l) communicating the results of the comparison carried out in the step g) or k) to a piece of equipment of the installation.
m) establishing that the result of the comparison carried out in the step g) or k) satisfies a criterion for stoppage corresponding to the detection of a magnetisation defect of a treatment zone or of a risk of tipping of the part to be clamped, n) activating a means of alert or display on the installation if the criterion for stoppage is satisfied during the step m), o) reporting the treatment zone to a piece of equipment of the installation if the criterion for stoppage corresponding to the detection of a magnetisation defect of this treatment zone is satisfied during the step l).

During the step d), the temperature is measured by a sensor on the clamping surface for each measuring zone, and during the step e), the actual magnetic clamping force corrected for the influence of the temperature measured is also calculated, for each measuring zone.

Before the step b) a system exterior to the clamping device, comprising a representation of the part and of the clamping plate memorises characteristic parameters of the part to be clamped and of the clamping plate and during the step b) the exterior system communicates the definition of the surface of the clamping plate in contact with the part to be clamped to the unit for controlling the magnetic clamping.

During the step h), a system exterior to the clamping device calculates the point of application of the theoretical magnetic force for each of the treatment zones and communicates this point of application to the unit for controlling the magnetic clamping.

The method consists in saving onto a recording medium the results of the calculations and comparisons of the theoretical forces and of the actual magnetic clamping forces per treatment zone.

The invention further relates to a magnetic clamping device comprising means intended to implement a method such as mentioned hereinabove, with the clamping plate comprising at least two measuring circuits arranged one above the other in relation to a plane perpendicular to the weight of the part to be clamped.

According to advantageous but not mandatory aspects of the invention, such a clamping device can incorporate one or several of the following characteristics, taken in any technically permissible combination:

the device comprises four measuring circuits, which divide the clamping plate into four treatment zones, the device comprises one measuring circuit per stud.

The invention shall be better understood and other advantages of the latter shall appear more clearly when reading the following description of a method for controlling the magnetic clamping of a part and of a magnetic clamping device using such a method, given solely by way of example and made in reference to the annexed drawings wherein.

Figure 1:
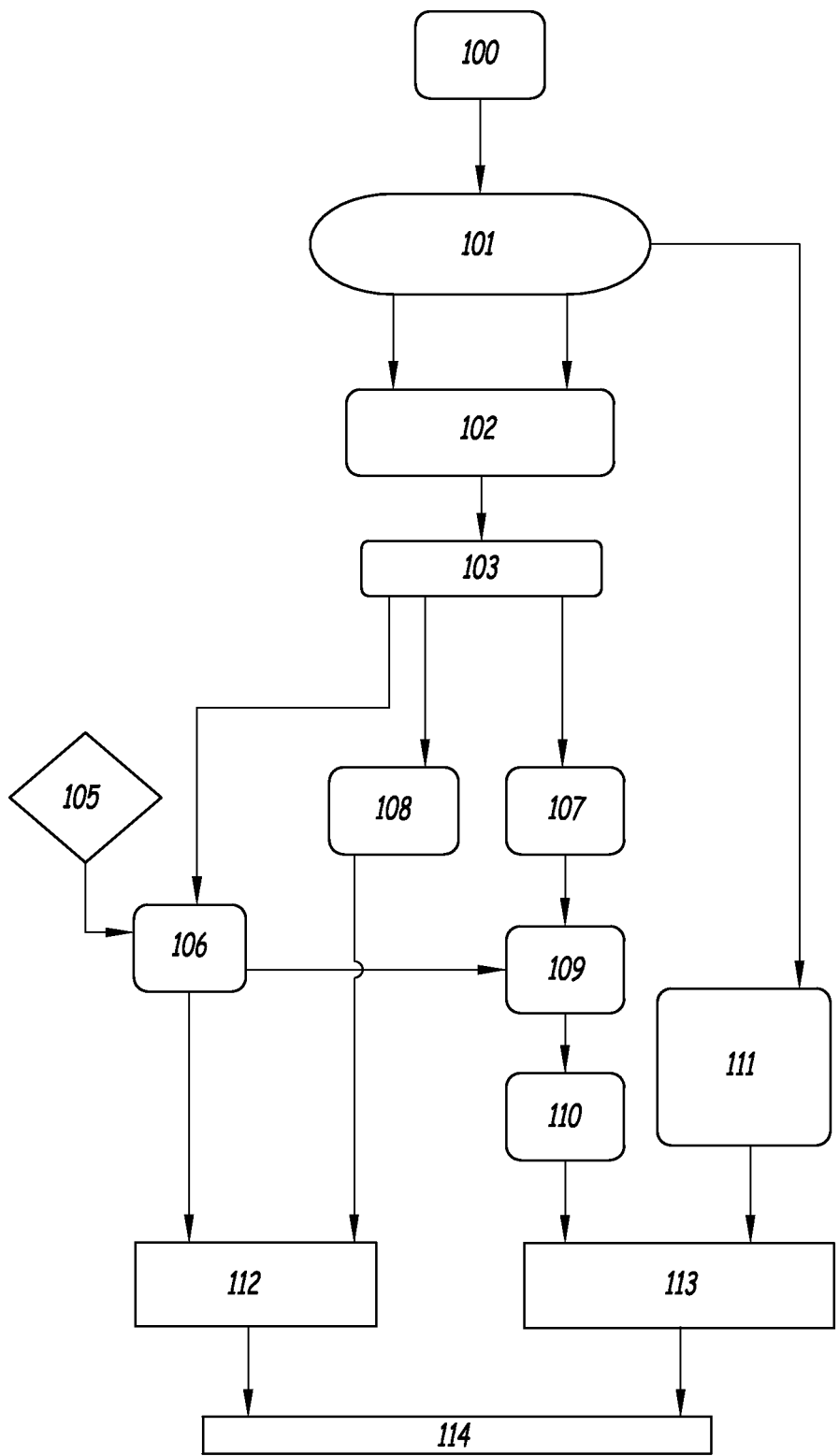
FIG. 1 is a block diagram showing a method in accordance with the invention for controlling the magnetic clamping of a part.
Figure 2:
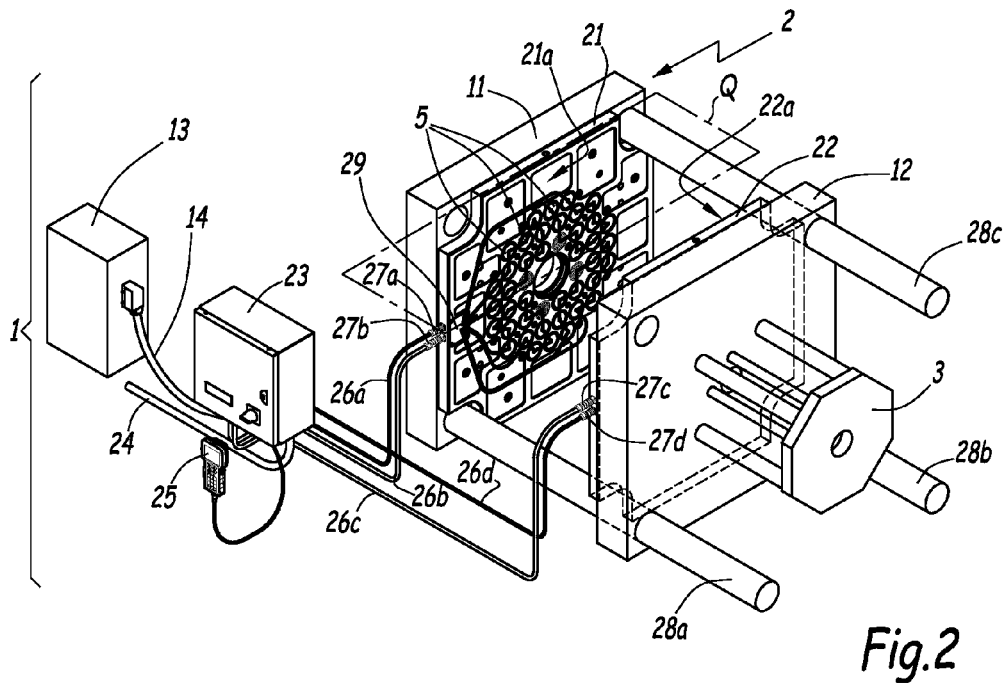
FIG. 2 is a perspective view of an injection moulding machine comprising a magnetic clamping device in accordance with the invention.

The injection moulding machine 1 shown in FIG. 2 comprises two press platens 11 and 12 arranged facing each other, with one of these platens 12 being mobile in translation in relation to the other 11. The machine 1 is provided with a magnetic clamping device 2 comprising two clamping plates 21 and 22, fixed respectively on the platens 11 and 12, on surfaces facing these platens. Each plate 21, 22 comprises magnetic studs 5 which comprise a carcass, comprised of an insulating material, such as a plastic material, which encompasses at its base a generally cylindrical permanent magnet, constituted in a material with a low coercive force such as an AlNiCo alloy. The magnetic studs 5 are housed in the plate 21, 22 and are flush in relation to a clamping surface 21*a*, 22*a* of the plate 21,22 oriented towards the other plate. The surface 22*a* can not be seen directly in FIG. 2 but is marked by its edges. An external pole intended to be flush in relation to the clamping surface 21*a*, 22*a* is housed above the permanent magnet of each magnetic stud 5. This pole receives, along its outer lateral wall, permanent magnets in the form of a portion of a cylindrical ring, with each magnet polarised radially in relation to stud 5. More precisely, each stud 5 comprises five magnets which are housed in windows of the carcass. The latter are comprised in a permanently magnetic material such as Neodyme, or in another material with a high coercive force, and held in place on the external ferromagnetic pole via magnetic attraction.

The platen 12 comprises on its rear surface opposite its clamping surface 22*a* a mobile member 3 that allows for the ejection of the injected parts.

Figure 4:
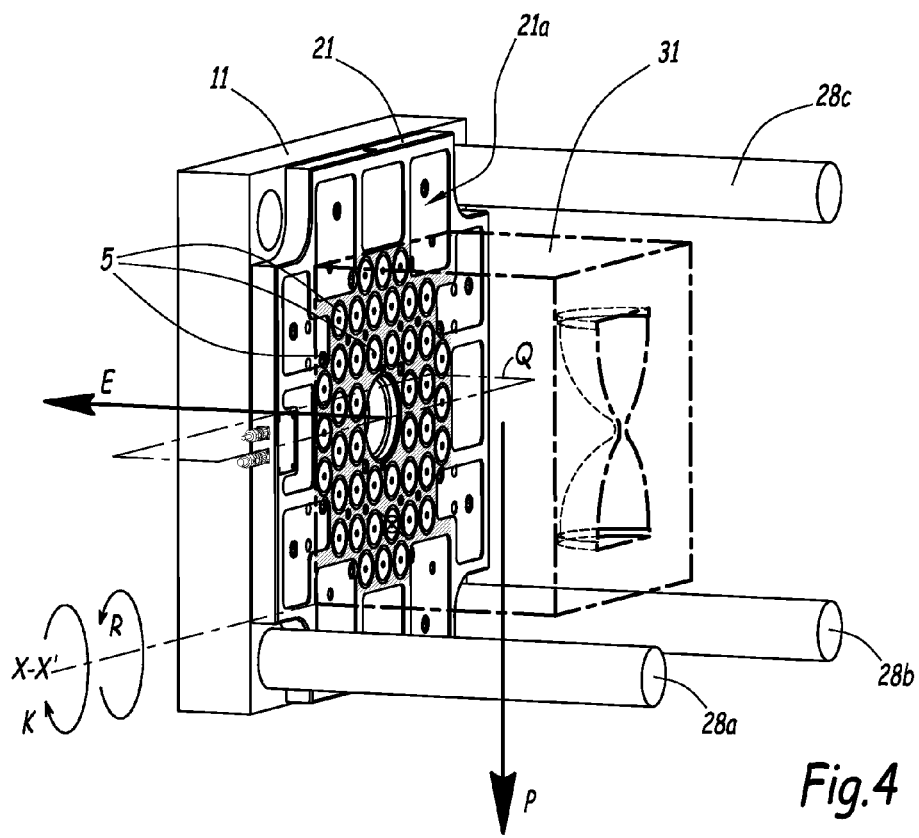
FIG. 4 is a perspective view of the clamping surface of the plate that can be seen in FIG. 2 whereon is positioned a mould.

The device 2 further comprises a unit 23 for controlling the clamping, which in particular comprises a power cable 24, a terminal 25, a computer and one or several power modules not shown. The computer is provided with data memories. The unit 23 for controlling the clamping is connected to each plate 21, 22 by means of two cables 26*a*, 26*b*, 26*c*, 26*d* connected to the plates 21 and 22 by the intermediary respectively of two connectors 27*a*, 27*b*, 27*c*, 27*d*. In addition, the unit 23 for controlling the clamping is connected to a unit 13 for controlling the press by means of a cable 14. A portion 31 of a mould, shown partially as axis lines only in FIG. 4 and constituted of a ferromagnetic material, is immobilised against the plate 21 by magnetic clamping. The mould is in two parts, and intended to be placed between the two plates 21 and 22 and to be immobilised against these two plates by magnetic clamping. Each portion of the mould is clamped onto one of the two clamping plates 21, 22. When the mould is as such clamped between the plates 21 and 22, the withdrawal movement of the mobile platen 12 drives the opening of the mould. In FIG. 4, the portion of the mould immobilised against the plate 22 is not shown, and likewise for the plate 22.

In FIG. 4, the overall retaining force E exerted by the clamping plate 21 on the portion 31 can be seen. In addition, the weight P of the portion 31 is also shown. These two forces E and P must be calculated and compared during each clamping operation in such a way that the retaining torque R of the portion 31, around a horizontal axis X-X' passing through a lower edge of the mould, is sufficient, in order to prevent the tipping of this portion 31.

Moreover, the movement of the mobile platen 12 is directed by the intermediary of four guiding axes. Only three of these axes that are denoted as 28*a*, 28*b*, 28*c* are shown in FIGS. 2 and 4, in order to better observe the clamping surface 21*a*.

Power windings are wound around permanent magnets of the studs 5, they make it possible to reverse the polarity of the magnets of the studs 5 via a brief supply of current, in one direction or the other, according to whether it is desired to magnetise or demagnetise the surface of a ferromagnetic part in contact with a stud. The magnets of the studs 5 generate a magnetic field of which the flux lines may extend towards the exterior of the studs 5, i.e. towards the exterior of the plate 21. When the studs 5 of the plate 21 are in the activated state, the flux lines are able to be closed by passing, from the plate 21, through the portion 31 of the mould to be clamped, with the plate 21 then exerting a clamping force on this portion.

When the power windings are adequately powered, they generate a new magnetic field opposite the magnetic field of the magnets. There is then a switch to a deactivated state, wherein the flux lines are confined in the plate 21, the clamping force exerted by the plate 21 on the portion 31 is then zero. The circuits formed by the power windings of the studs 5 remain known to those skilled in the art and form the power circuits which are not shown in this invention.

Figure 3:
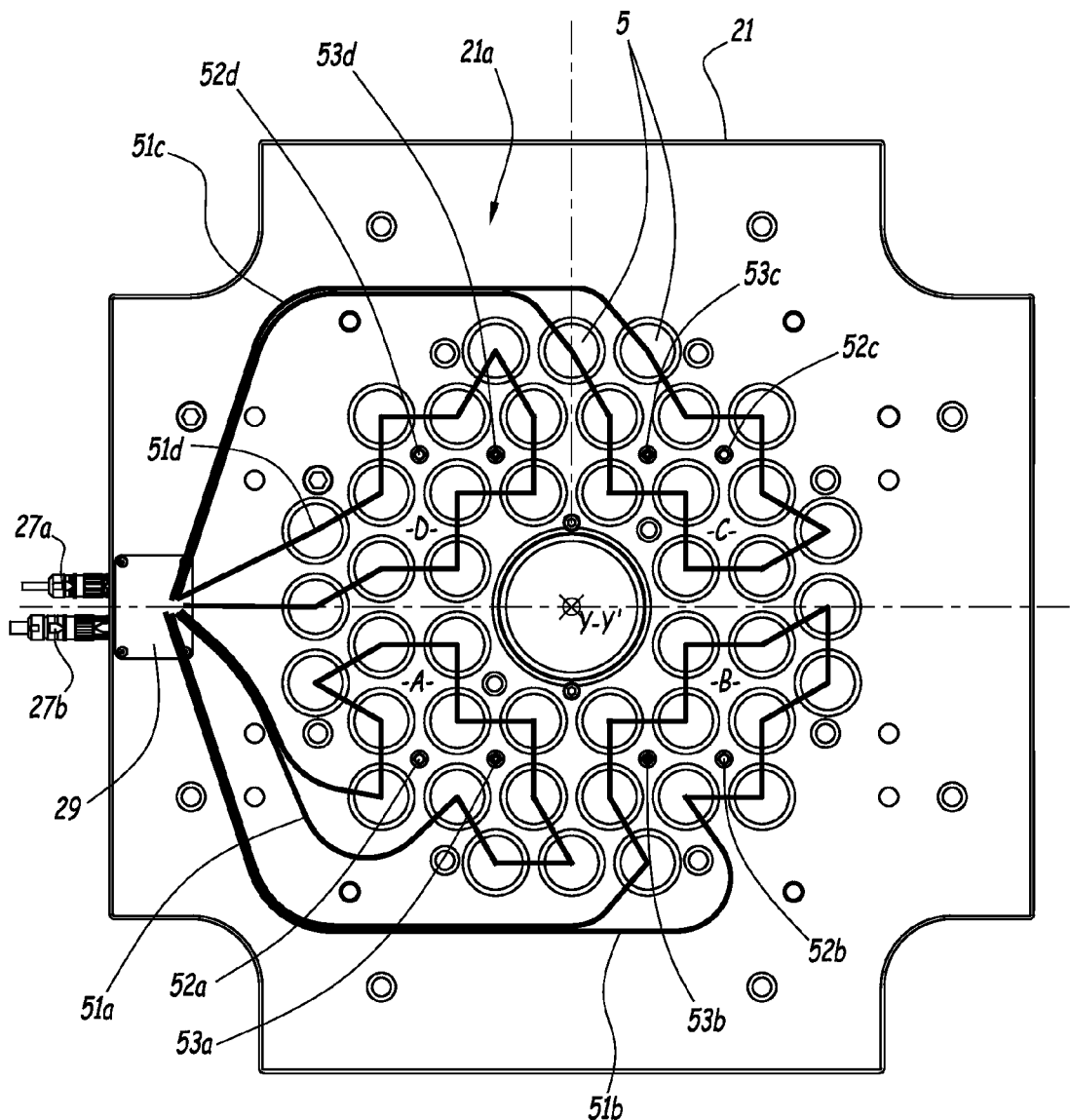
FIG. 3 is a front view on a larger scale of the clamping surface of a plate of the magnetic clamping device that can be seen in FIG. 2, with the connections internal to the plate shown as heavy lines.

In FIG. 3, the clamping surface 21a, of the clamping plate 21 is observed. More particularly four separate circuits 51a, 51b, 51c and 51d that connect four groups of separate studs 5 are distinguished. These circuits 51a, 51b, 51c, 51d are formed by the association in series of windings not shown for measuring the fluxes passing through the studs 5. These circuits make it possible to measure the fluxes passing through the studs 5 to which they are associated and each include the same number of studs, i.e. eleven studs in the example. Each measuring circuit 51a, 51b, 51c, 51d is connected to a terminal block 29 which is itself connected to the unit 23 for controlling the clamping by the intermediary of the cables 26a, 26b.

The unit 23 for controlling the clamping comprises a computer or signal processing circuits for measuring the flux coming from the circuits 51a, 51b, 51c, 51d for the purposes of estimating the clamping force exerted by the studs 5 included in these various measuring circuits 51a, 51b, 51c, 51d, over a portion 31 of a mould to be clamped. The measuring circuits 51a, 51b, 51c, 51d make it possible to cover the clamping surface by zones and to have knowledge of the clamping conditions per zone and not only just clamping conditions over the entire clamping plate 21. The clamping conditions of an installation of a device are determined with a mould in a more precise manner than with known systems.

In addition, detectors of the presence 52a, 52b, 52c, 52d of a mould or of an object on the clamping plate 21 are present in each zone corresponding to a measuring circuit 51a, 51b, 51c, 51d.

Likewise, temperature sensors 53a, 53b, 53c, 53d are present in each zone corresponding to a measuring circuit 51a, 51b, 51c, 51d.

In FIG. 3, the plate 21 comprises four temperature sensors 53a, 53b, 53c, 53d which are each present in a zone defined by a different measuring circuit 51a, 51b, 51c, 51d. The same is true for the presence detectors 52a, 52b, 52c, 52d. Knowledge is therefore available of the temperature by zones and of the presence or the absence of a portion of a mould facing each measuring zone. A, B, C, D denote the four zones formed by the studs 5 of the four measuring circuits 51a, 51b, 51c, 51d.

In order to control the magnetic clamping, a method for controlling is set in place thanks to the unit 23 for controlling the clamping. Using the measuring zones A, B, C, D four treatment zones Za, Zb, Zc, Zd are determined at the beginning of the method during a first step 100. The treatment zone Za is thus determined which corresponds approximately to a 90° quadrant located in a lower left corner of the plate 21 in relation to an axis Y-Y' passing through the centre of the plate 21 and along which the platen 12 is in movement in relation to platen 11. The zone Za corresponds to the studs included in the circuit 51a.

In the same way, the treatment zones Zb, Zc and Zd are determined which correspond respectively and approximately to a lower right quadrant, an upper right quadrant and an upper left quadrant of the plate 21 and to the studs included in the circuits 51b, 51c, 51d.

A second step 101 for this method consists in making it such that the computer of the unit 23 for controlling the clamping incorporates files that contain the characteristic parameters of the plates 21, 22 and information on the configuration of the plates 21 and 22, i.e. the location of the studs 5, their belonging to the measuring circuits 51a, 51b, 51c, 51d, and on the characteristic parameters of the mould, in particular of its portion 31, i.e. its weight P and its centre of gravity. The computer further incorporates the dimensions of the mould, if there is a surface facing the plate 21 of a simple shape, for example circular or rectangular, or even polygonal. An additional operation consists in calculating, using the computer of the unit 23 and based on the dimensions entered for the mould, the surface of the mould 31 facing the plate 21. On the other hand, if the contact surface of the portion 31 of the mould is of a complex shape, i.e. it is for example a surface with curved edges, not in an arc of circle, or a surface composed of several separate portions, the computer of the unit 23 for controlling will directly use the files exterior to the computer defining the surface of the mould of the portion 31 facing the plate 21.

During a step 102, the computer defines a surface S of the clamping plate 21 and of the studs 5, in contact with the mould 31 using surface calculations carried out in the step 101.

Figure 5:
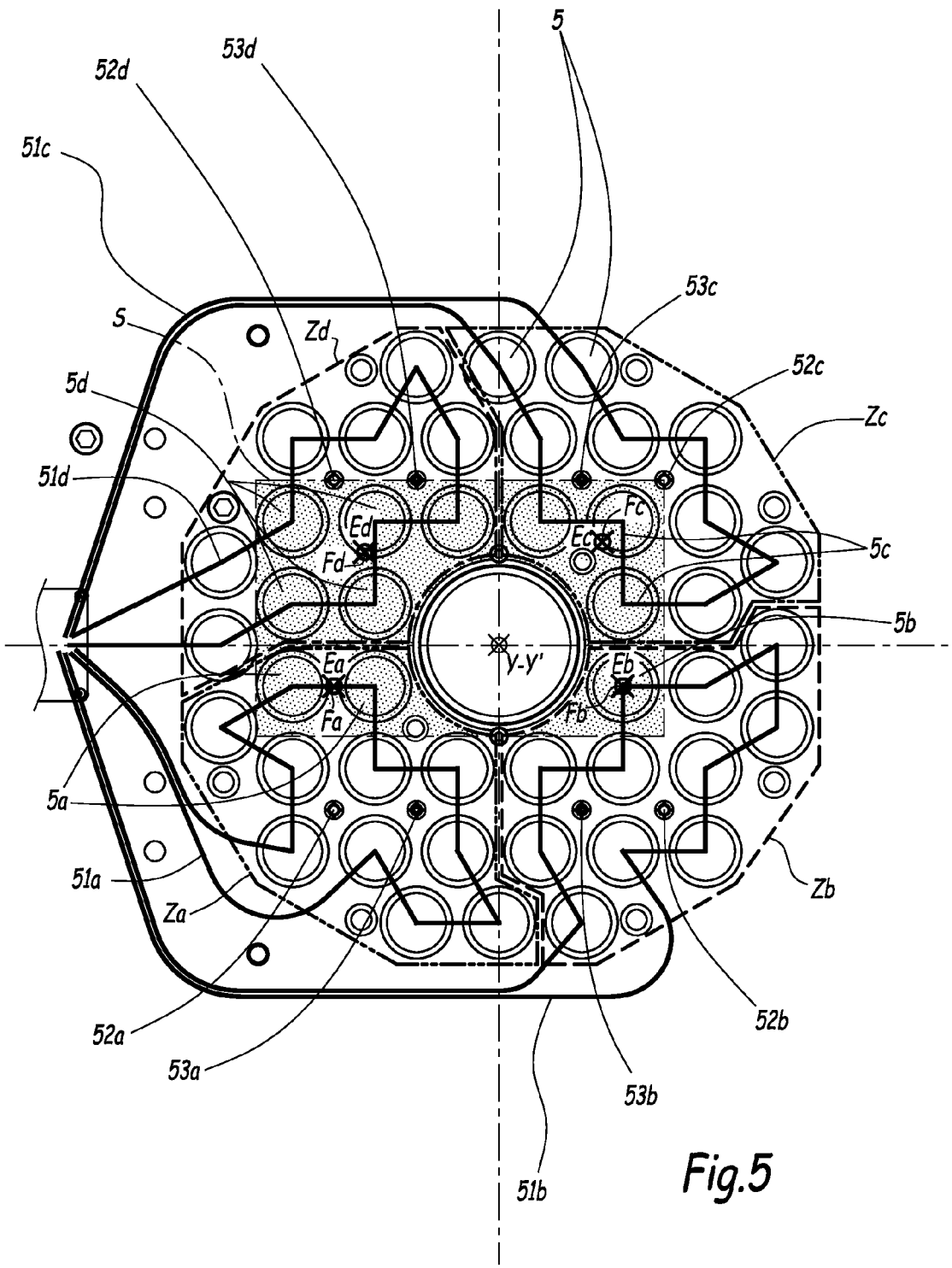
FIG. 5 is a view similar to FIG. 3, on a larger scale, wherein is shown a contact surface of a mould with the clamping plate and its magnetic studs.

In FIG. 5, the contact surface S of the clamping plate 21 and of its magnetic studs 5 with the part to be clamped 31 is shown by the greyed zone except on certain references Ea to Ed and Fa to Fd mentioned hereinafter for the clarity of the drawing. This surface S contains eleven magnetic studs 5 and is only an example of the type of contact surface possible. 5a, 5b, 5c, 5d denote studs included in the surface S and belonging respectively to the measuring circuits 51a, 51b, 51c, 51d. The zones Za, Zb, Zc, Zd include respectively two, one, three and five studs 5a, 5b, 5c, 5d in contact with the portion of mould 31.

Then, during a step 103, the identification of the stud or studs included in the surface S is carried out for each circuit 51a, 51b, 51c, 51d using the location of the studs 5 on the plate 21 and the definition of the surface S. This step also allow the computer to evaluate the covered surfaces of the studs included in the surface S, and more precisely the surfaces of the external poles of the covered magnetic studs.

A following step 105 during the magnetising of the part to be clamped 31 following the activation of the magnetic studs 5 of the plate 21, is the acquisition by the intermediary of the various sensors 53a, 53b, 53c, 53d of temperature measurements for each measuring zone A, B, C, D and magnetic flux measurements for each measuring circuit 51a, 51b, 51c, 51d. The computer reads the magnetic flux produced by the studs 5a, 5b, 5c, 5d included in the surface S.

During the method of controlling the magnetic clamping of a portion of the mould 31, a step 106 consists in calculating an actual magnetic clamping force Ea, Eb, Ec, Ed for each treatment zone Za, Zb, Zc, Zd based on the magnetic flux measurement by measuring circuit 51a, 51b, 51c, 51d of the step 105, the identifying carried out during the step 103, the determining of the treatment zones Za, Zb, Zc, Zd in the step 100 and the defining of the surface S carried out in the step 102.

Indeed, it is known that a negligible magnetic flux passes through the magnetic studs 5 when the latter are not magnetised. When the plate 21 is magnetised, the unit for controlling 23 receives the measuring signals from the measuring circuits 51a, 51b, 51c, 51d that read a variation in the magnetic flux that passes through the studs 5a, 5b, 5c, 5d on measuring zones A, B, C, D covered by the part to be clamped.

By considering the output voltage of the measuring circuit, the contact surface of the clamping plate 21 and of its magnetic studs 5 and the magnetic surface of the magnetic studs it is possible to deduce the actual magnetic flux and the clamping force produced by the clamping plate 21.

Indeed if S' is defined as the surface area magnetised by the studs of a measuring circuit 51a, 51b, 51c, 51d, Bm as the density of the magnetic flux through this measuring zone, and µ0 as the permeability of the air, it is easy to deduce the actual magnetic clamping force of the studs E:

the density of the magnetic flux Bm is deduced using the formula for magnetic flux variation applied to each magnetic stud: $\Delta\phi=-(\int edt)/N$ with $\epsilon$ as the output voltage of a measuring coil, $\Delta\phi$ the variation in magnetic flux, and N the number of spires around a magnetic stud.

$$E=Bm2 \cdot S'/(2\mu 0) \text{ is then obtained}$$

Note that the magnetised surface area to be considered for this calculation is the sum of the surface areas of the external poles of the magnetic studs and the surface area of the plate covered by the part to be clamped.

As the clamping plate 21 has measuring zones A, B, C, D which define treatment zones Za, Zb, Zc, Zd, the point of application Fa, Fb, Fc, Fd of the actual magnetic clamping force Ea, Eb, Ec, Ed for each treatment zone Za, Zb, Zc, Zd is defined theoretically during a step 107. This point is calculated using the identification of the studs included in the surface S. This is the barycentre of the covered surfaces of the studs 5a, 5b, 5c, 5d identified in the step 103 for each treatment zone Za, Zb, Zc, Zd.

The step 107 therefore consists in calculating for each treatment zone Za, Zb, Zc, Zd the point of application of the actual magnetic force Ea, Eb, Ec, Ed based on the calculation of the barycentre Fa, Fb, Fc, Fd of the covered surfaces of the studs 5a, 5b, 5c, 5d identified in the step 103. On the other hand, if the contact surface of the portion 31 of the mould is of a complex shape, the computer of the unit for controlling uses the files exterior to the unit for controlling defining the barycentres of the covered surfaces of the studs 5a, 5b, 5c, 5d. The exterior system such as the CAD tool can then communicate these files to the computer of the unit for controlling 23.

Thanks to the identification of the step 103 and to the defining of the surface S carried out in the step 102, during a step 108 the computer of the unit 23 for controlling the clamping calculates the theoretical magnetic clamping force E'a, E'b, E'c, E'd for each treatment zone Za, Zb, Zc, Zd. This is the theoretical force or target force that a treatment zone Za, Zb, Zc, Zd is supposed to generate in normal conditions.

In a step 112, the computer carries out the comparison of the actual magnetic clamping forces Ea, Eb, Ec, Ed with the theoretical forces E'a, E'b, E'c, E'd for each treatment zone Za, Zb, Zc, Zd by establishing the absolute or relative differences between the two values for the force. The difference in the force calculated makes it possible in particular to detect the magnetic losses per circuit 51a, 51b, 51c, 51d. Then the comparison of this difference with a threshold value, set beforehand, is carried out during a step 114; in other words the step 114 establishes that the result of the comparison of the actual magnetic clamping forces Ea, Eb, Ec, Ed with the theoretical forces E'a, E'b, E'c, E'd for each treatment zone Za, Zb, Zc, Zd satisfies a criterion for stoppage set beforehand. In the case where the difference detected is greater than this value a magnetisation defect is detected. The unit 23 transmits a signal or a message to the operator to report that a treatment zone is not correctly carrying out its function of magnetisation and that there is a risk of malfunction for the device. The clamping unit reports the identifier of the treatment zone which is in fault to a piece of equipment of the installation. The clamping procedure stops, the installation enters into a breakdown mode in order to prohibit operations from continuing and maintain secure conditions for the installation. The value of the threshold, or the criterion for stoppage of the force fault, can for example be set to 90% of the nominal value of magnetic flux produced by a set of magnetic studs linked to a measuring circuit.

The temperature reading for each circuit makes it possible to anticipate certain faults which can be linked to the change in the temperature and approach a finer evaluation of the values Ea, Eb, Ec, Ed, of the actual magnetic clamping force by circuit 51a, 51b, 51c, 51d. Indeed, a magnet can lose its magnetic capacities with changes in the surrounding conditions, such as the temperature.

In parallel to the calculation of the forces by circuit, the unit 23 is capable in a step 109 to calculate, starting from the results of the calculations of the steps 106 and 107, the holding torque of the actual forces exerted by the studs included in the surface S for each treatment zone Za, Zb, Zc, Zd.

Then are calculated on the one hand during a step 110 which follows the step 109, the sum R of the holding torques of the actual magnetic clamping forces around the X axis-X' and, on the other hand during a step 111, the tipping torque K deduced from the values known in the step 101: the weight P of the portion 31 of the mould and the position of its centre of gravity in relation to its tipping axis.

The unit 23 can as such, in what follows and during a step 113, compare the two torques R and K by establishing the absolute or relative differences between the two torque values; then during the step 114 calculate the ratio between the two torques R and K and check that it does not reach a threshold set beforehand, which makes it possible to provide an evaluation of the risk of the mould tipping in relation to the actual clamping forces; in other words the step 114 also makes it possible to establish that the result of the comparison between the two torques R and K satisfies a criterion for stoppage set beforehand. The operator can as such be warned of the risk of the mould tipping. The value of the threshold, or the criterion for stoppage linked to the tipping, can be set to 10 i.e. if the ratio of the holding torque to the tipping torque is less than 10, then the unit 23 transmits, during the step 114, a signal or a message to a piece of equipment that the operator can access in order to inform the operator of a risk of the portion 31 of the mould tipping. The clamping procedure stops, the installation enters into a breakdown mode in order to prohibit operations from continuing and maintain secure conditions for the installation.

If the conditions required for a secure clamping of the mould are present, the operator is informed of this, he can then resume the unhooking of the mould from a hoist and run the operations for the production of injected parts.

At each plate magnetisation operation the operator can be informed of the fault in magnetisation of a treatment zone Za, Zb, Zc, Zd—and the zone at fault can be reported by its identifier—or of the risk of tipping of the part to be clamped thanks to this method. The device 2 communicates to the installation 1 the results of the operations of comparison by treatment zone Za, Zb, Zc, Zd, which can cause the display of messages or the activation of a means of alert on a piece of equipment of the installation, such as a control console, at the exceeding of the threshold values of the magnetisation force and of the holding torque analysed previously.

The unit 23 for controlling the clamping controls at each magnetic clamping procedure the clamping force exerted by each plate 21, 22 on the corresponding portion of the mould 31 according to the same method as that described previously, with the two plates 21, 22 being generally similar.

In addition, the treatment zones Za, Zb, Zc, Zd, do not have any intersections between them and a zone Za, Zb, Zc, Zd, cannot include others. It is therefore advantageous that the points of application Fa, Fb, Fc, Fd of the respective actual magnetic forces Ea, Eb, Ec, Ed of each zone Za, Zb, Zc, Zd, not be confounded and that all are not contained in the same horizontal plane, so that the unit for controlling 23 can analyse and compare the contribution of the actual magnetic clamping forces Ea, Eb, Ec, Ed of the treatment zones Za, Zb, Zc, Zd, chosen, for the holding of the mould and against its tipping. Those skilled in the art easily understand indeed that the loss of the actual magnetic clamping forces Ea, Eb, Ec, Ed over the upper portion of the mould further increases the risk of tipping and leads to a holding situation that is more critical than an equivalent loss of actual magnetic forces Ea, Eb, Ec, Ed over the lower portion of the mould. That is why the clamping method for the mould analyses the actual clamping forces Ea, Eb, Ec, Ed by taking into account the position of the points of application Fa, Fb, Fc, Fd of the actual magnetic forces Ea, Eb, Ec, Ed of each treatment zone Za, Zb, Zc, Zd on the plate 21.

Alternatively, the computer can calculate during the step 106, the actual magnetic forces corrected for the influence of the temperature measured during the step 105.

According to another alternative, the step 102 can be carried out by an exterior system such as a CAD tool wherein the CAD representation of the portion 31 and of the plate 21 is recorded, and the surface S of the clamping plate 21 and of the studs 5 in contact with the mould 31 is defined before being transmitted to the computer of the unit for controlling magnetic clamping.

According to another alternative of the step 107, a system exterior to the clamping device, such as the CAD tool, calculates the point of application Fa, Fb, Fc, Fd of the actual magnetic force Ea, Eb, Ec, Ed for each treatment zone Za, Zb, Zc, Zd and it communicates the point of application Fa, Fb, Fc, Fd of the actual magnetic force Ea, Eb, Ec, Ed for each treatment zone Za, Zb, Zc, Zd to the unit 23 for controlling the magnetic clamping. The invention is not limited to the example described and shown. Alternatively, elements of the unit 23 for controlling clamping, in particular the computer, can be arranged to the exterior of the unit 23 for controlling. For example the computer could be integrated directly into the unit 13 for controlling the injection press.

The invention also provides for a recording medium which records all of the data and results pertaining to the calculations and comparisons of the theoretical forces E'a, E'b, E'c, E'd and of the actual magnetic clamping forces Ea, Eb, Ec, Ed by treatment zone Za, Zb, Zc, Zd described previously, and for a given mould configuration.

Alternatively, instead of comprising four measuring circuits 51a, 51b, 51c, 51d, the device 2 comprises two measuring circuits, arranged above one another in relation to a plane Q perpendicular to the weight P of the portion 31 of mould, or three circuits or more than five circuits. In FIG. 2, the plane Q passes through the centre of the plate and the measuring circuit 51d is above the measuring circuit 51a in relation to the plane Q.

According to another alternative, each measuring circuit can comprise a different number of studs.

According to yet another alternative, a measurement of the magnetic flux is carried out for each stud 5 in a measuring zone, there is therefore one measuring circuit per stud.

Alternatively, the surface of the mould intended to be in contact with the surface 21a of the plate 21 is not flat. In this case, the contact surface S of the mould with the plate 21 can be, for example, the sum of several separate and even disjointed surfaces, in contact with the plate 21 and its surface area is less than that of the surface of the mould facing the plate 21.

The magnetic clamping device 2 was described in the framework of an injection moulding machine. However, such a device 2 can be transposed to many other applications and, in particular, for industrial installations that require the clamping of parts with a substantial, reversible and controlled force, such as hoisting by magnetic clamping or the positioning of ferromagnetic parts to be machine tooled.

In another alternative not shown, the method can be used on a device such that the magnetisation of the surface of the part to be clamped is carried out by the pairing of the pair of studs with reversed polarity of which the activation makes it possible to magnetise a ferromagnetic part positioned on their two surfaces. The flux lines are then generated between the studs activated by pair through the part to be clamped by the activation of the power circuit or circuits of the studs.

Alternatively, and in the framework of the invention, it is provided that certain steps be carried out in an order that is different from the embodiment described hereinabove, or be treated in a parallel manner. For example, it can be considered to determine the treatment zones during a step 100 in a manner parallel to the carrying out of a step 102 of defining the contact surface S between the plate and the part to be clamped.

The various alternatives described hereinabove can be combined together entirely or partially, in order to give rise to other embodiments of the invention.

The invention claimed is:

1. Method for controlling the magnetic clamping of a part (31) in a magnetic clamping device (2) of an industrial installation (1) comprising, a unit (23) for controlling the magnetic clamping, a clamping plate (21) whereon is positioned the part to be clamped (31), several magnetic studs (5) housed in this plate (21), with the studs being connected to magnetic flux measuring circuits (51a, 51b, 51c, 51d) defining measuring zones (A, B, C, D) and to power circuits making it possible to magnetise or demagnetise the studs (5), characterised in that the method comprises prior steps consisting in:
 a) determining (100) at least two treatment zones (Za, Zb, Zc, Zd) each defined by at least one measuring zone (A, B, C, D)
 b) defining (102) a surface (S) of the clamping plate (21) in contact with the part to be clamped (31) and
in that the method comprises for each treatment zone (Za, Zb, Zc, Zd), steps consisting in:
 c) identifying (103) one or more magnetic studs (5a, 5b, 5c, 5d) included in the surface (S) of the clamping plate (21) in contact with the part to be clamped (31),
 d) measuring (105) the magnetic flux produced by the stud or studs (5a, 5b, 5c, 5d) identified in step c)
 e) calculating (106) an actual magnetic clamping force (Ea, Eb, Ec, Ed) based on the measurement of the step d), on the definition of the surface (S) in contact carried out in the step b) and on the identification of the studs (5a, 5b, 5c, 5d) carried out in the step c),
 f) calculating (108) a theoretical magnetic force (E'a, E'b, E'c, E'd) thanks to the definition of the surface (S) in contact carried out in the step b) and the identification of the studs (5a, 5b, 5c, 5d) carried out in the step c).

2. Method according to claim 1, characterised in that it comprises a step consisting for each treatment zone (Za, Zb, Zc, Zd), in:

g) comparing (112) the actual magnetic clamping force (Ea, Eb, Ec, Ed) and the theoretical magnetic force (E'a, E'b, E' c, E' d) calculated in steps e) and f).

3. Method according to claim 1, characterised in that it comprises steps consisting for each treatment zone (Za, Zb, Zc, Zd), in:

h) calculating (107) a point of application (Fa, Fb, Fc, Fd) of the actual magnetic force (Ea, Eb, Ec, Ed) by considering the barycentre of the covered surfaces of the studs (5a, 5b, 5c, 5d) identified in the step c), i) calculating (109) a holding torque of the actual magnetic force (Ea, Eb, Ec, Ed) using the results of the calculations of the steps e) and h).

4. Method according to claim 3, characterised in that it comprises steps consisting in:

j) calculating (111) the theoretical tipping torque (K) of the part based on characteristic parameters of the part to be clamped (31) and characteristic parameters of the clamping plate (21), k) comparing (113) a sum (R) of the holding torques of the actual magnetic forces (Ea, Eb, Ec, Ed) calculated (109) for each treatment zone (Za, Zb, Zc, Zd) during the step i) with the theoretical tipping torque (K) calculated in the step j).

5. Method according to claim 4, characterised in that it comprises a step consisting in:

l) communicating the results of the comparison carried out in the step k) to a piece of equipment of the installation (1).

6. Method according to claim 4 characterised in that it comprises a step consisting in:

m) establishing (114) that the result of the comparison carried out in the step k) satisfies a criterion for stoppage corresponding to the detection of a magnetisation defect of a treatment zone (Za, Zb, Zc, Zd) or of a risk of tipping of the part to be clamped (31).

7. Method according to claim 6, characterised in that it comprises a step consisting in:

n) activating a means of alert or display on the installation (1) if the criterion for stoppage is satisfied during the step m).

8. Method according to claim 6, characterised in that it comprises a step consisting in:

o) reporting the treatment zone (Za, Zb, Zc, Zd) to a piece of equipment of the installation (1) if the criterion for stoppage corresponding to the detection of a magnetisation defect of this treatment zone (Za, Zb, Zc, Zd) is satisfied during the step m).

9. Method according to claim 1, characterised in that:

during the step d), the temperature is measured (105) by a sensor on the clamping surface (21a) for each measuring zone (A, B, C, D)

during the step e), the actual magnetic clamping force corrected for the influence of the temperature measured is also calculated for each measuring zone (A, B, C, D).

10. Method according to claim 1, characterised in that before the step b) a system exterior to the clamping device, comprising a representation of the part (31) and of the clamping plate (21) memorises (101) characteristic parameters of the part to be clamped and of the clamping plate and in that during the step b) the exterior system communicates the definition of the surface (S) of the clamping plate in contact with the part to be clamped to the unit (23) for controlling the magnetic clamping.

11. Method according to claim 3, characterised in that, during the step h), a system exterior to the clamping device calculates (107) the point of application (Fa, Fb, Fc, Fd) of the theoretical magnetic force (E'a, E' b, E' c, E' d) for each of the treatment zones (Za, Zb, Zc, Zd) and communicates this point of application (Fa, Fb, Fc, Fd) to the unit (23) for controlling the magnetic clamping.

12. Method according to claim 1, characterised in that it consists in saving on a recording medium the results of the calculations and of the comparisons of theoretical forces (E'a, E'b, E' c, E' d) and actual magnetic clamping forces (Ea, Eb, Ec, Ed) by treatment zone (Za, Zb, Zc, Zd).

13. Magnetic clamping device (2), characterised in that it comprises means (23) intended to implement a method according to claim 1 and in that the clamping plate (21) comprises at least two measuring circuits (51a, 51d) arranged above one another in relation to a plane (Q) perpendicular to the weight (P) of the part to be clamped.

14. Device according to claim 13, characterised in that the device comprises four measuring circuits (51a, 51b, 51c, 51d), which divide the clamping plate (21) into four treatment zones (Za, Zb, Zc, Zd).

15. Device according to claim 13, characterised in that the device comprises one measuring circuit (51a, 51b, 51c, 51d) per stud (5).

16. Method according to claim 2, characterised in that it comprises a step consisting in:

l) communicating the results of the comparison carried out in the step g) to a piece of equipment of the installation (1).

17. Method according to claim 2 characterised in that it comprises a step consisting in:

m) establishing (114) that the result of the comparison carried out in the step g) satisfies a criterion for stoppage corresponding to the detection of a magnetisation defect of a treatment zone (Za, Zb, Zc, Zd) or of a risk of tipping of the part to be clamped (31).

18. Method according to claim 17, characterised in that it comprises a step consisting in:

n) activating a means of alert or display on the installation (1) if the criterion for stoppage is satisfied during the step m).

19. Method according to claim 17, characterised in that it comprises a step consisting in:

o) reporting the treatment zone (Za, Zb, Zc, Zd) to a piece of equipment of the installation (1) if the criterion for stoppage corresponding to the detection of a magnetisation defect of this treatment zone (Za, Zb, Zc, Zd) is satisfied during the step m).

* * * * *